United States Patent [19]
Schroeder et al.

[11] Patent Number: 5,754,042
[45] Date of Patent: May 19, 1998

[54] MAGNETORESISTIVE ENCODER FOR TRACKING THE ANGULAR POSITION OF A ROTATING FERROMAGNETIC TARGET WHEEL

[75] Inventors: Thaddeus Schroeder, Rochester Hills; Bruno Patrice Bernard Lequesne, Troy, both of Mich.; Hiro Yamasaki, Palos Verdes Estate, Calif.

[73] Assignees: General Motors Corporation, Detroit, Mich.; Hughes Aircraft Company, Los Angeles, Calif.

[21] Appl. No.: 262,097

[22] Filed: Jun. 20, 1994

[51] Int. Cl.⁶ .............................. G01B 7/30; H01L 43/08
[52] U.S. Cl. ........................ 324/207.25; 324/207.21; 338/32 R
[58] Field of Search .................... 324/207.2, 207.21, 324/207.22, 207.25, 235, 251, 252; 327/509, 510; 338/32 R, 32 H

[56] References Cited

U.S. PATENT DOCUMENTS

| | | | |
|---|---|---|---|
| 3,818,326 | 6/1974 | Masuda et al. | 324/207.25 |
| 4,039,936 | 8/1977 | Jones et al. | 324/207.21 |
| 4,086,533 | 4/1978 | Ricouard et al. | 324/207.2 |
| 4,204,158 | 5/1980 | Ricouard et al. | 324/207.2 |
| 4,570,118 | 2/1986 | Tomczak et al. | 324/207.22 |
| 4,616,281 | 10/1986 | Nakamura | 360/113 |
| 4,737,710 | 4/1988 | Van Antwerp et al. | 324/251 |
| 4,745,363 | 5/1988 | Carr et al. | 324/251 |
| 4,746,859 | 5/1988 | Malik | 324/207.25 |
| 4,851,771 | 7/1989 | Ikeda et al. | 338/32 R |
| 4,926,121 | 5/1990 | Guay | 324/207.2 |
| 5,019,776 | 5/1991 | Kawamata et al. | 324/207.21 |
| 5,043,660 | 8/1991 | Hasegawa | 324/207.21 |
| 5,243,279 | 9/1993 | Bajat et al. | 324/207.21 |
| 5,444,370 | 8/1995 | Wu | 324/207.2 |

FOREIGN PATENT DOCUMENTS

| | | | |
|---|---|---|---|
| 0 555 961 | 8/1993 | European Pat. Off. . | |
| 0 580 207 | 1/1994 | European Pat. Off. . | |
| 0058069 | 5/1979 | Japan | 324/207.21 |
| 0084519 | 4/1986 | Japan | 324/207.21 |
| 0318914 | 12/1989 | Japan | 324/207.25 |
| 402208570 | 8/1990 | Japan | 324/207.25 |

*Primary Examiner*—Sandra L. O'Shea
*Assistant Examiner*—Jay M. Patidar
*Attorney, Agent, or Firm*—Howard N. Conkey

[57] ABSTRACT

An apparatus for detecting precise angular positions of a rotating object. Two magnetoresistors (MRs) are positioned adjacent a target wheel attached to the rotating object, the target wheel having at least one element of finite length. Each MR is responsive to the passage of at least one of the elements as the target wheel is rotated, generating an analog signal with signal transitions between two voltage levels at the passage of the element's leading and trailing edges. The MRs are positioned relative to the elements such that their signals are phase shifted with respect to one another, resulting in time overlapping signals which intersect at a precise angular positions of the target wheel.

6 Claims, 9 Drawing Sheets

MAGNETORESISTIVE ENCODER FOR TRACKING THE ANGULAR POSITION OF A ROTATING FERROMAGNETIC TARGET WHEEL

This invention relates to an apparatus for detecting precise angular positions of a rotating object, and more particularly, for accurately detecting such positions independent of parameter variations such as temperature and air gap. This invention is particularly suited to various speed and position measurement requirements found on automotive vehicles utilizing ferromagnetic target wheels.

BACKGROUND OF THE INVENTION

Angular rotation of a ferromagnetic object can be magnetically sensed by measurement of changes in a magnetic field caused by movement of the ferromagnetic object through the magnetic field.

Prior art sensors include a ferromagnetic target wheel attached to and rotated by a rotating object (the speed and/or position of which is desired), a stationary biasing magnet positioned adjacent to the periphery of the target wheel, and a magnetoresistor (MR) mounted on the surface of the stationary magnet adjacent to the target wheel. Spaced along the target wheel periphery are teeth, separated by slots. The MR is subjected to a magnetic field developed between the magnet and target wheel. As the target wheel rotates, the passage of teeth adjacent the magnet varies the developed magnetic flux density which, in turn, varies the resistance of the MR.

Appropriate electronic circuitry is connected to the MR for producing an analog signal which varies in accordance with the MR's varying resistance. All voltages of the analog signal above a predetermined constant threshold voltage represent detection of a tooth positioned adjacent the MR. Detection of each tooth corresponds to a particular angular position of the target wheel and the rotating object to which it is attached.

Temperature, air gap variations and magnet aging will affect the resistance of the MR and its corresponding analog signal. Since detection of a tooth is achieved by comparing voltage levels of the MR analog signal to a constant threshold voltage, an analog signal having voltage levels which vary at a particular angular position of the target wheel from one rotation of the target wheel to the next will result in varying angular positions of the target wheel at which the teeth are detected.

In applications requiring precise, repeatable detection of target wheel angular positions, the accuracy of prior art sensors is unacceptable.

SUMMARY OF THE INVENTION

The present invention is directed to an apparatus for detecting precise angular positions of a rotating object. It is applicable to rotating objects comprising ferromagnetic and nonferromagnetic target wheels incorporating magnetic and optical sensing devices, respectively.

According to the present invention, a target wheel having at least one element of finite length is attached to the rotatable object. A dual magnetoresistive sensor is positioned adjacent the target wheel. Each magnetoresistor (MR) is responsive to the passage of at least one of the elements as the target wheel is rotated, generating an analog signal with signal transitions between two voltage levels at the passage of the element's leading and trailing edges.

The MRs are positioned relative to the elements such that their analog signals are phase shifted with respect to one another, resulting in time overlapping analog signals which intersect (i.e., have equal voltages) at precise angular positions of the target wheel.

Varying parameters such as temperature, air gap and magnet aging may affect the voltage levels of the individual MR analog signals, but the angular positions of the target wheel at which the intersections of the two analog signals occur remain unchanged from one complete rotation of the target wheel to the next, thereby ensuring repeatable detection.

DETAILED DESCRIPTION OF THE PREFERRED EMBODIMENT

Figures 1, 2, 3:
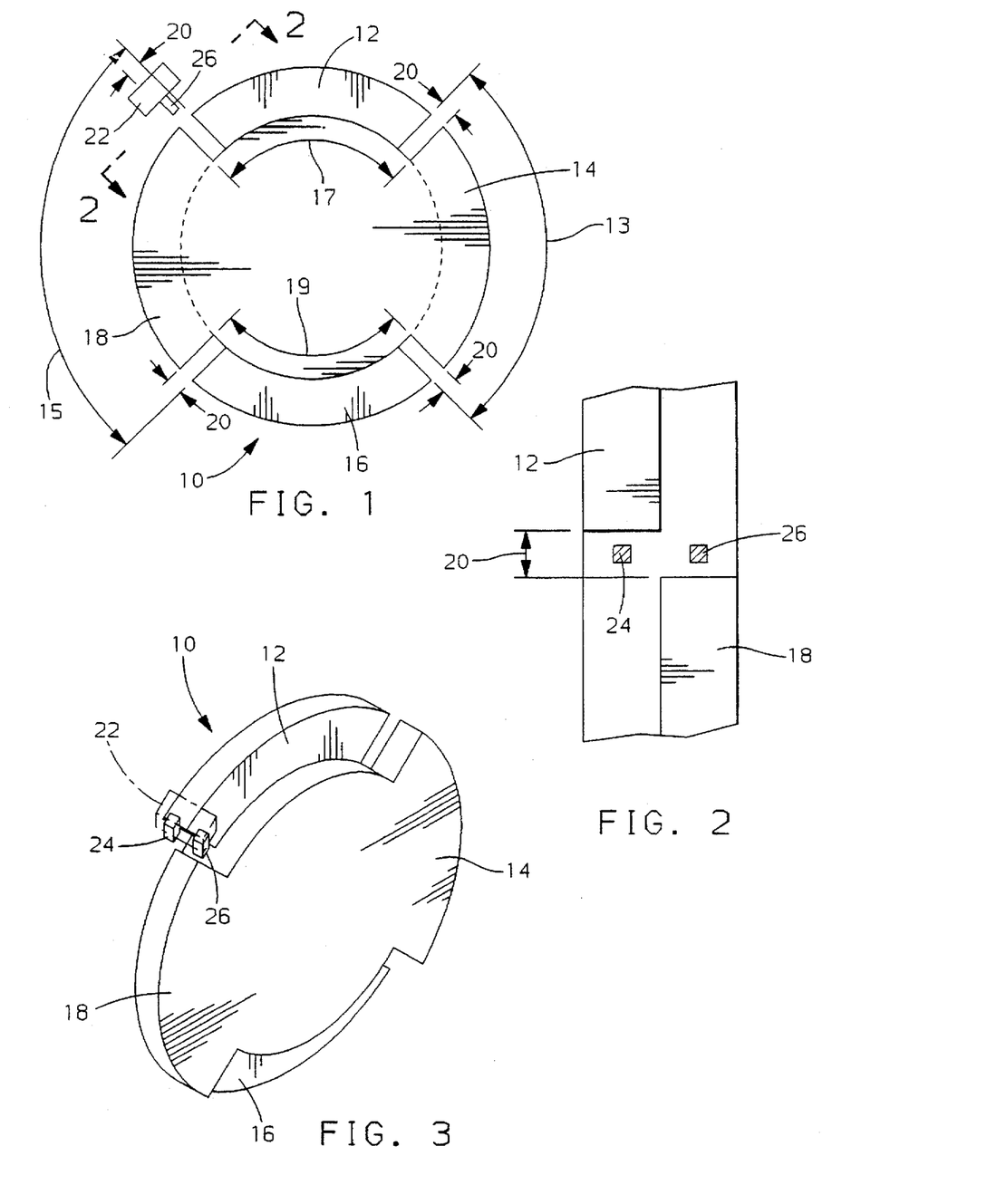
FIG. 1 illustrates a plan view of a target wheel constructed in accordance with the present invention.
FIG. 2 illustrates a sectional view of the target wheel of FIG. 1.
FIG. 3 illustrates a perspective view of the target wheel of FIG. 1.

FIG. 1 illustrates a plan view of a ferromagnetic target wheel constructed in accordance with one embodiment of this invention. The target wheel 10 is attached to and rotated by a rotating object (not shown), the speed and/or position of which is to be determined.

The target wheel 10 has four teeth 12, 14, 16 and 18 located along its periphery. Two of the teeth 12 and 16 are located within one half of the target wheel width and separated by slots 13 and 15. The remaining two teeth 14 and 18 are located within the opposing half of the target wheel width, at different angular positions as teeth 12 and 16, and separated by slots 17 and 19. The length of each tooth and slot may vary.

Angularly adjacent teeth 12 and 14, 14 and 16, 16 and 18, and 18 and 12 are separated by equally-sized toothless regions 20 in which no teeth are located in either half of the target wheel 10. These toothless regions 20 coincide with the overlap of angularly adjacent slots 13 and 19, 19 and 15, 15 and 17, and 17 and 13.

A stationary biasing magnet 22 is positioned adjacent to the periphery of the target wheel 10. Two magnetoresistors (MRs) 24 and 26 are mounted on the surface of the magnet 22, adjacent to the encoder wheel 10.

FIGS. 2 and 3 illustrate a sectional and perspective view, respectively, of the target wheel of FIG. 1, showing the physical orientation of the two MRs 24 and 26 with respect to the target wheel 10 and teeth 12, 14, 16 and 18. One MR 24 is positioned adjacent to one half of the target wheel width in which teeth 12 and 16 are located. The other MR 26 is positioned adjacent to the opposing half of the target wheel width in which teeth 14 and 18 are located.

A magnetic flux density existing between the biasing magnet 22 and target wheel 10 varies as the teeth 12, 14, 16 and 18 pass adjacent to the biasing magnet 22. The length of the toothless regions 20 are constructed such that with a toothless region 20 positioned adjacent to the biasing magnet 22, no teeth 12, 14, 16 or 18 are positioned directly adjacent to either MR 24 and 26.

Figure 4:
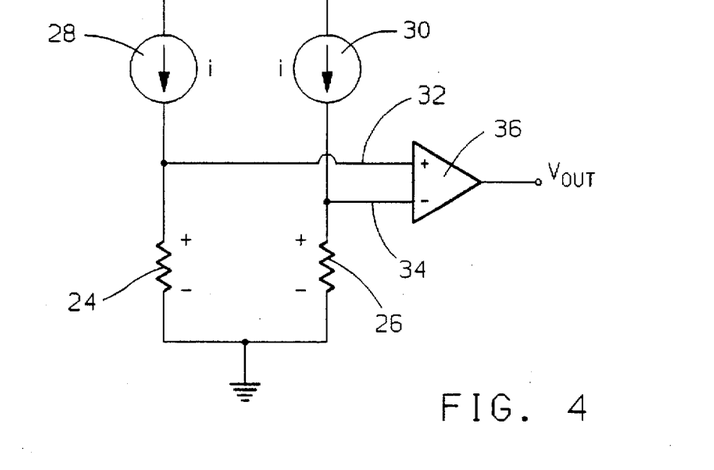
FIG. 4 illustrates an interface circuit for generating and processing MR analog signals.

FIG. 4 illustrates an interface circuit for generating and processing MR analog signals. The two MRs 24 and 26 have resistances which vary in the presence of varying magnetic flux, which in turn varies in response to the passage of teeth on the target wheel adjacent the biasing magnet 22. By applying constant current sources 28 and 30 to MRs 24 and 26, respectively, the voltage across MRs 24 and 26 will cyclically vary in accordance with their cyclically varying resistances.

Figure 5A:
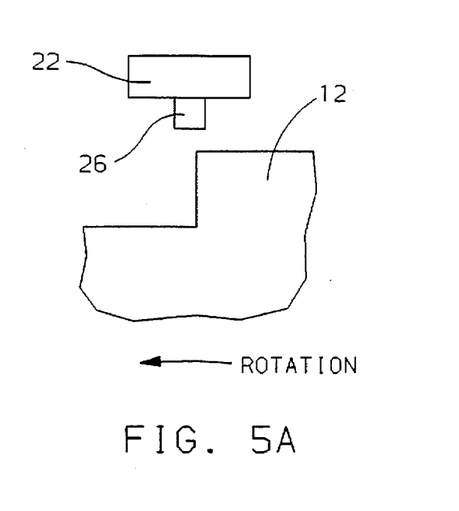
FIGS. 5A and 5B illustrate physical and graphical representations of slot/tooth transition.
Figure 5B:
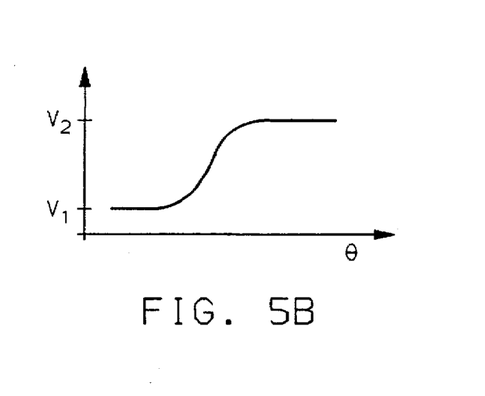
Figure 6A:
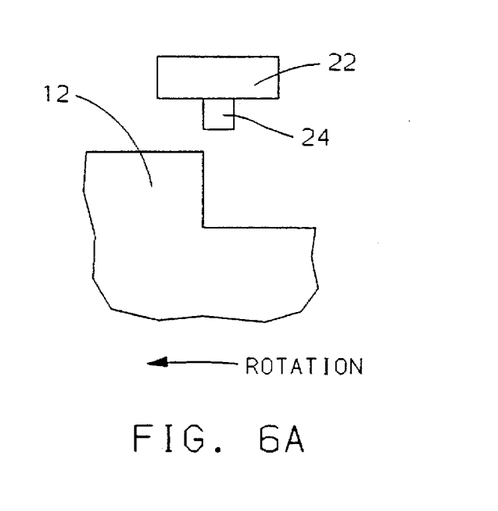
FIGS. 6A and 6B illustrate physical and graphical representations of tooth/slot transition.
Figure 6B:
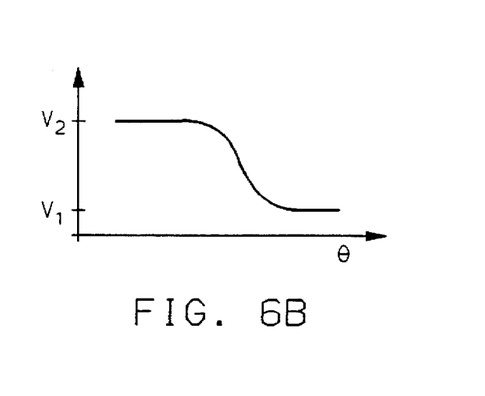

FIGS. 5 and 6 illustrate physical and graphical representations of slot/tooth and tooth/slot transitions, respectively. Referring to FIG. 5A, as a tooth, in this case 12, approaches the biasing magnet 22, the magnetic flux density between the magnet 22 and the half of the target wheel 10 in which the tooth 12 is located begins to increase, increasing the resistance of the respective MR, in this case 24. The magnetic flux density is at a maximum when the tooth 12 is positioned directly adjacent to the magnet 22. The voltage across the MR 24 follows a similar pattern as the MR's resistance, as illustrated in FIG. 5B. Note that a slot/tooth transition graphically corresponds to a voltage increase (positive slope) from a first $V_1$ to a second $V_2$ voltage potential.

Conversely, as illustrated in FIG. 6A, as the tooth 12 passes by the biasing magnet 22, the magnetic flux density begins to decrease, decreasing the MR's resistance. The magnetic flux density is at a minimum when the magnet 22 is positioned adjacent to the center of a slot (i.e., equidistant between two adjacent teeth within the same half of the target wheel). The voltage developed across the MR follows a similar pattern as the MR's decreasing resistance, as illustrated in FIG. 6B. Note that a tooth/slot transition graphically corresponds to a voltage decrease (negative slope) from a second $V_2$ to a first $V_1$ voltage potential.

Referring back to FIG. 4, voltages across MRs 24 and 26 are input into comparator 36 via signal lines 32 and 34, respectively. The comparator 36 provides a binary output $V_{out}$ which is utilized by a controller (not shown) for determining the speed and/or position of the target wheel 10.

Figure 7A:
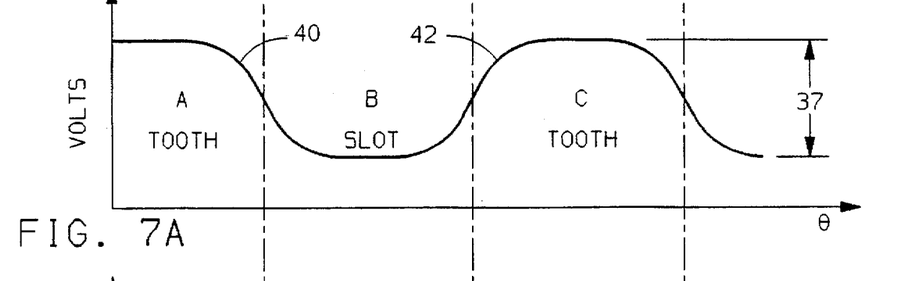
FIGS. 7A through 7C illustrate the MR analog signals generated by the interface circuit of FIG. 4.
Figure 7B:
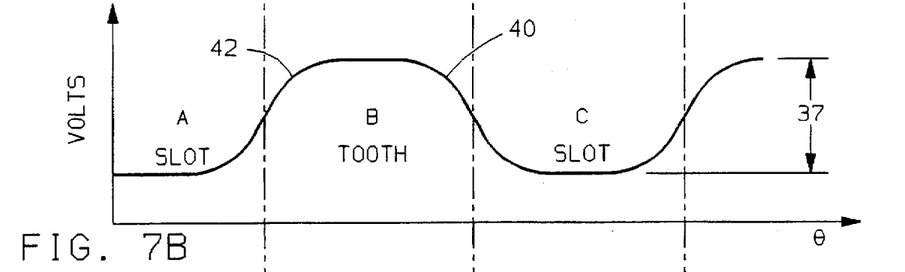
Figure 7C:
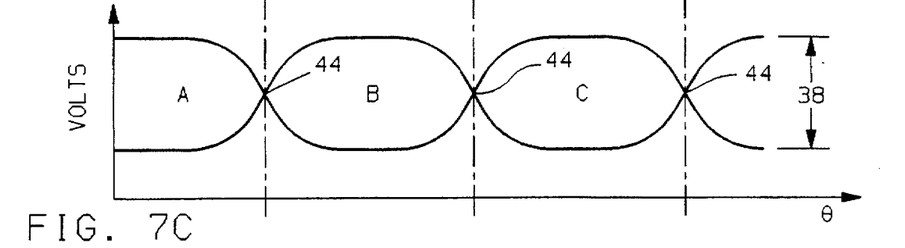

FIGS. 7A through 7C illustrate the analog signals generated by MRs 24 and 26. The analog signal generated by MR 24 is illustrated in FIG. 7A. The high voltage output in signal regions A and C correspond to a high MR resistance (i.e., tooth adjacent to the MR 24). A slot adjacent MR 24 produces a lowered resistance and corresponding lowered output voltage, represented by signal region B. The negatively-sloped portion 40 of the signal between signal regions A and B corresponds to a tooth/slot transition, while the positively-sloped portion 42 of the signal between signal regions B and C corresponds to a slot/tooth transition.

The analog signal generated by MR 26 is illustrated in FIG. 7B. The design of the preferred embodiment results in MR 26 detecting a slot when MR 24 detects a tooth, and vice versa. Additionally, when MR 24 detects a tooth/slot transition 40, MR 26 detects a slot/tooth transition 42, and vice versa.

As illustrated in FIGS. 7A through 7C, the analog signals of both MRs 24 and 26 are mirror-images of one another (i.e., each identical in peak-to-peak voltage, shape and frequency but 180° out-of-phase). This mirror-image construction results in an intersection 44 at exactly one-half of the peak-to-peak voltage 37 of both analog signals.

The peak-to-peak voltage 37 of both analog signals is also equal to the voltage difference 38 between the two analog signals as a result of their mirror-image construction. The voltage difference 38 is a function of the flux density difference between the two MRs 24 and 26. Empirical testing has revealed that the flux density difference is at an optimum when the width of each tooth is slightly less than one-half the width of the target wheel. This optimally minimizes the effect of a tooth in one-half of the target wheel on an MR positioned adjacent to the opposing half.

The points at which the analog signals of the two sensors are equal are referred to as the crossover points 44. Graphically, they represent the intersection of tooth/slot 40 and slot/tooth transitions 42 of the two MR analog signals. Physically, each crossover point 44 represents a precise angular position (θ) of the target wheel.

Parameters affecting both MRs simultaneously such as temperature, air gap variations and magnet aging, may affect the peak-to-peak voltages 37 of the individual MR analog signals, but their corresponding voltage difference 38 will remain equal to the peak-to-peak voltage, and the crossover points 44 will occur at the same angular positions of the target wheel.

Because the angular position of the target wheel 10 at which the crossover points 44 will occur do not vary from one target wheel rotation to the next despite variations in the MR analog signals, the present invention provides a robust, accurate and repeatable means of detecting precise angular positions of the target wheel.

The voltage level at which the crossover points 44 occur is dependent upon the length of the toothless regions 20 of FIG. 1. Crossover points 44 occur at the maximum slopes (one-half peak-to-peak voltage) of each analog signal when the analog signals are mirror-images of one another. Empirical testing is required to determine the precise length of the toothless regions 20 to produce mirror-image MR analog signals. Locating the crossovers 44 at a point on each analog signal with greatest slope improves the system robustness because deviations of the crossover points 44 at a greater signal slope will result in smaller angular deviations (θ) from the target wheel angular position to be indicated by the signal crossover point 44 than at a lesser slope. This is illustrated in FIG. 8.

Figure 8:
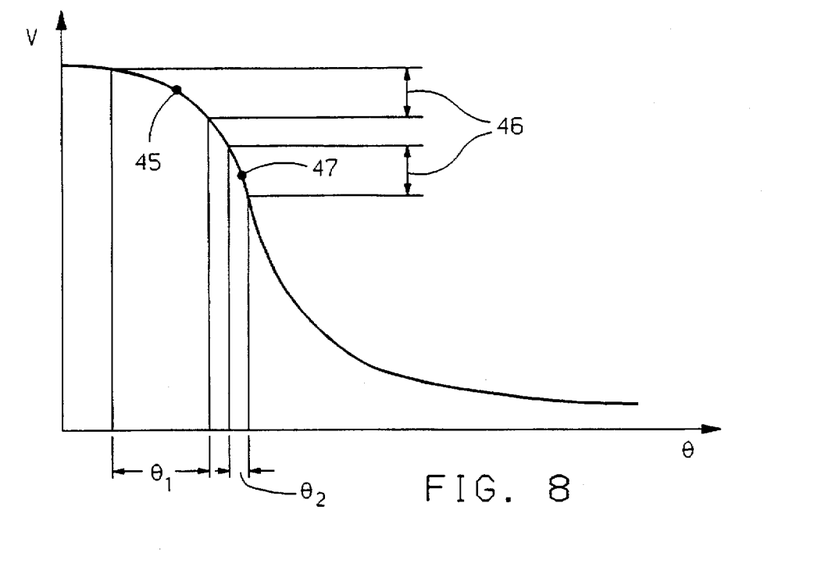
FIG. 8 illustrates the effect of crossover point slope location on position detection accuracy.

Referring to FIG. 8, a first crossover point 45 varying within a ΔV range 46 at a smaller slope within a tooth/slot transition (negative slope) will result in an angular deviation θ1 of the target wheel position much greater than an angular deviation θ2 resulting from the same ΔV range 46 surrounding a crossover point 47 at a much larger slope. Therefore, deviations from the desired indicated angular positions of the target wheel in response to variations in the crossover point are minimized if the crossover point is established at the point along the analog signal where the analog signal transitions 40 and 42 have the greatest slope.

Referring back to FIG. 4, the respective analog signals of FIGS. 7A and 7B are transmitted to the comparator 36 of FIG. 4 via signal lines 32 and 34. Comparator 36 outputs a high voltage (e.g., 5 V) for all voltages across MR 24 (FIG. 7A) greater than across MR 26 (FIG. 7B). All voltages across MR 24 less than across MR 26 will result in a low voltage output (e.g., 0 V). High voltage outputs are assigned a binary value of "1" while low voltage outputs are assigned a binary value of "0".

Figure 9A:
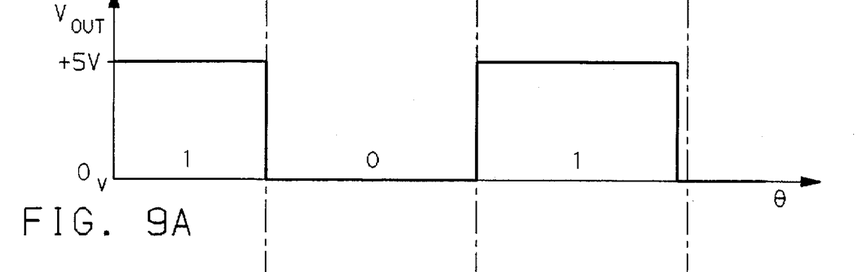
FIGS. 9A and 9B illustrate the binary output of the interface circuit of FIG. 4, and the relationship of the binary output to the crossover points of the MR analog signals.
Figure 9B:
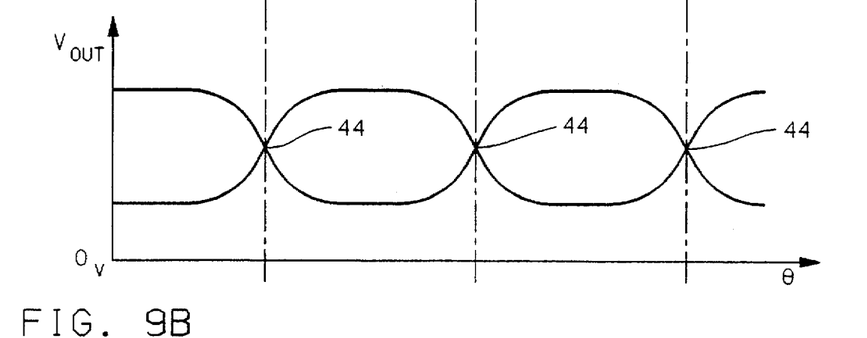

The resultant binary signal produced by the interface circuit of FIG. 4 is illustrated in FIG. 9A. The binary sequence will be an alternating pattern of "1's" and "0's". FIG. 9B is a reillustration of the MR analog signals of FIG. 7C, included here for convenience. Comparing FIGS. 9A and 9B, notice that both the leading and trailing edges of each binary pulse occurs at a crossover point 44. By monitoring transitions between the high and low voltage levels from the output of comparator 36, appropriate controllers (not shown) can determine the occurrence of crossover points 44 corresponding to a precise angular position of the target wheel, successive crossover points 44 indicating an incremental angular rotation of the target wheel. This information is then used for various angular speed and/or position calculations of the rotating object to which the target wheel is attached.

Figure 10:
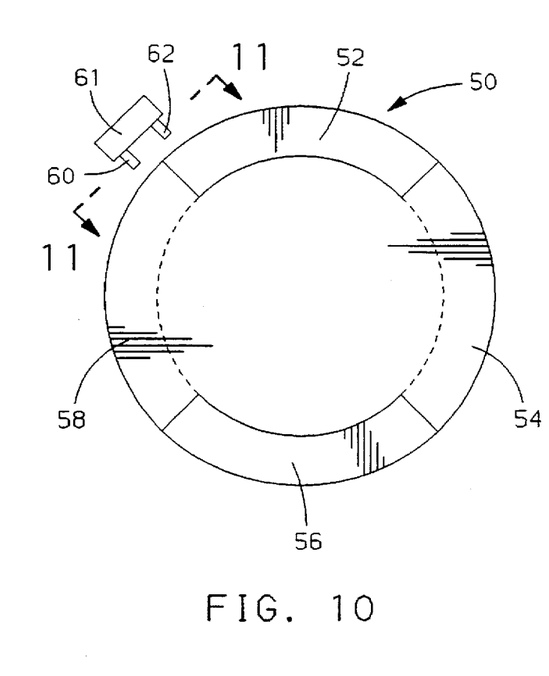
FIG. 10 illustrates a plan view of a first alternative embodiment with offset sensors.
Figure 11:
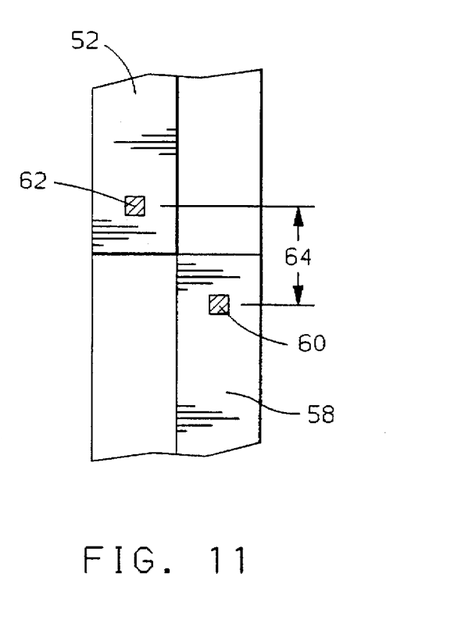
FIG. 11 illustrates a sectional view of the first alternative embodiment of FIG. 10.
Figure 12:
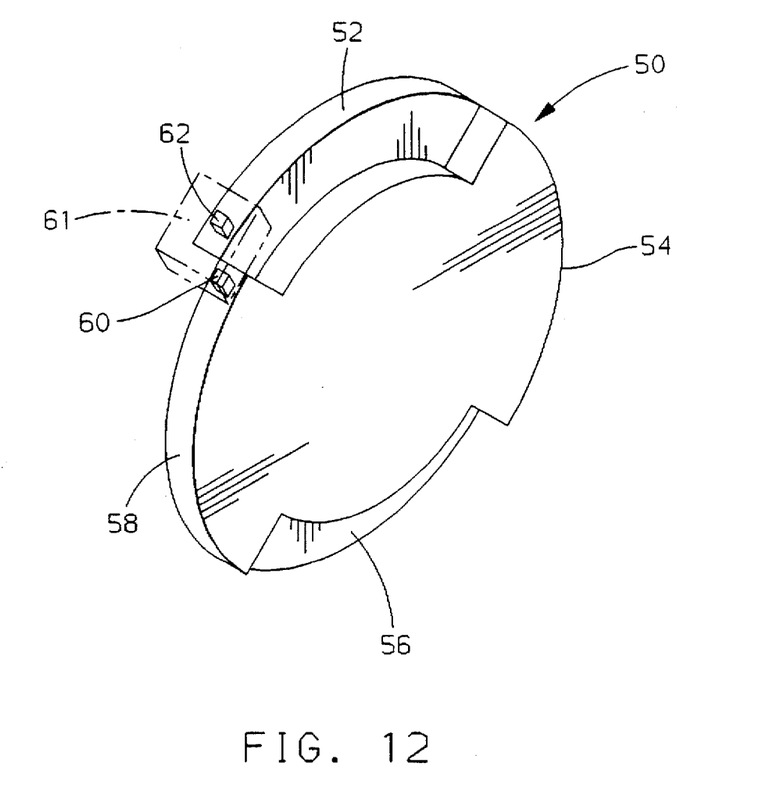
FIG. 12 illustrates a perspective view of the first alternative embodiment of FIG. 10.

There are several alternative embodiments which accomplish similar results as the preferred embodiment. One such alternative embodiment is illustrated in FIGS. 10, 11 and 12. The target wheel 50 is similarly constructed as the target wheel 10 of FIG. 1, except that adjacent teeth 52, 54, 56 and 58 are not angularly separated by toothless regions 20. In this embodiment, although the two MRs 60 and 62 are mounted on a common biasing magnet 61, they are staggered by an offset 64 to provide for phase shifted analog signals having crossover points at the maximum slope of both analog signals.

Figure 13:
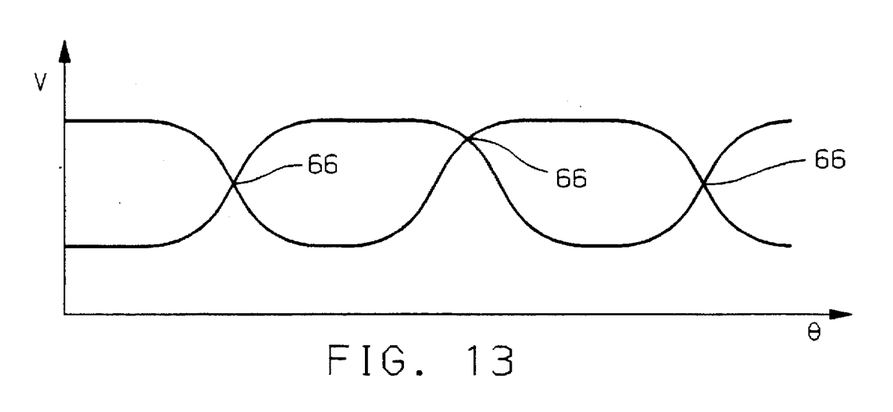
FIG. 13 illustrates the MR analog signals of the first alternative embodiment of FIG. 10.

The MR analog signals of this embodiment are illustrated in FIG. 13. The offset 64 configuration of the two sensors 60 and 62, and the staggered configuration of the teeth 52, 54, 56 and 58 without a toothless region 20 result in a crossover point 66 occurring at the maximum slope of both analog signals only once every other intersection. To ensure accuracy, only the crossovers 66 occurring at the maximum slopes of both analog signals are utilized by controllers in speed and position calculations. Therefore, the detection resolution of this embodiment is one-half that of the preferred embodiment.

Figure 14:
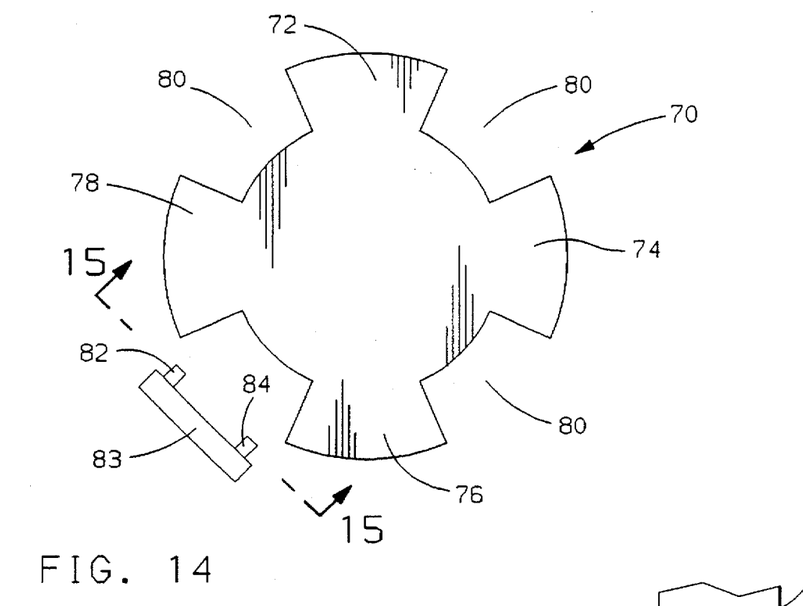
FIG. 14 illustrates a second alternative embodiment having two MRs aligned with the target wheel rotation and separated by a distance less than the length of slots separating teeth positioned along the target wheel periphery.
Figure 15:
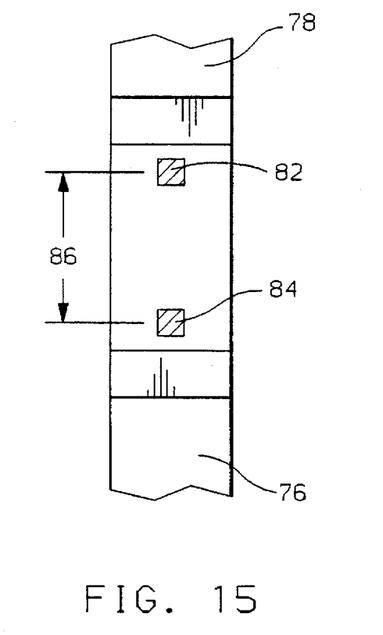
FIG. 15 illustrates a sectional view of the second alternative embodiment of FIG. 14.
Figure 16:
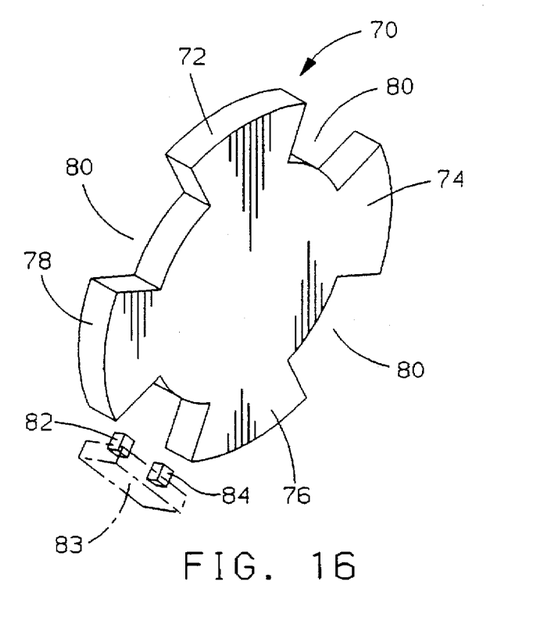
FIG. 16 illustrates a perspective view of the second alternative embodiment of FIG. 14.

A second alternative embodiment is illustrated in FIGS. 14, 15 and 16 in which the target wheel 70 has teeth 72, 74, 76 and 78 which are spaced along its periphery. The teeth extend across the entire width of the target wheel 70, adjacent teeth being separated by equal-length slots 80. Sensors 82 and 84 are mounted on a common biasing magnet 83 and linearly aligned along the periphery of the target wheel 70. The distance 86 separating the MRs 82 and 84 is less than the length of the slots 80 by an amount required to provide for phase shifted analog signals having crossover points at the maximum slope of the two analog signals.

Figure 17A:
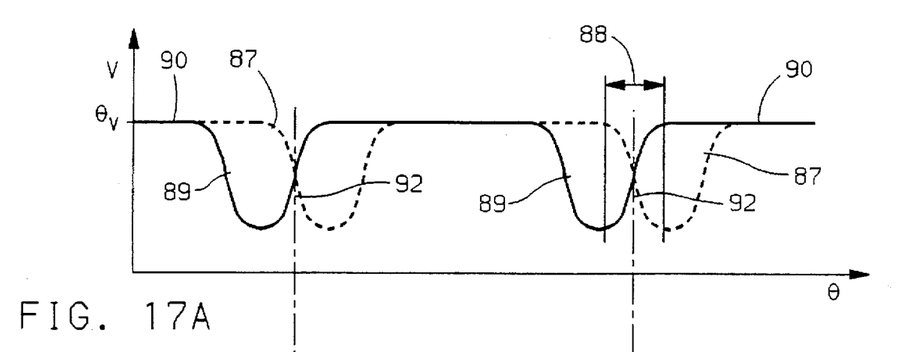
FIGS. 17A and 17B illustrate the MR analog signals produced by the second alternative embodiment of FIG. 14.

The analog signals generated by this embodiment are illustrated in FIG. 17A. Signal 87 is produced by sensor 84 and signal 89 is produced by sensor 82. The analog signals are identical to each other except for a given phase shift 88 as a result of delayed sensing of the same teeth (i.e., angular offset 86 of the MRs). Notice that there are large portions 90 of both signals with equal voltages besides the crossover points 92. Circuitry is required to detect only the desired crossovers 92 corresponding to simultaneous tooth/slot and slot/tooth transitions.

Figure 17B:
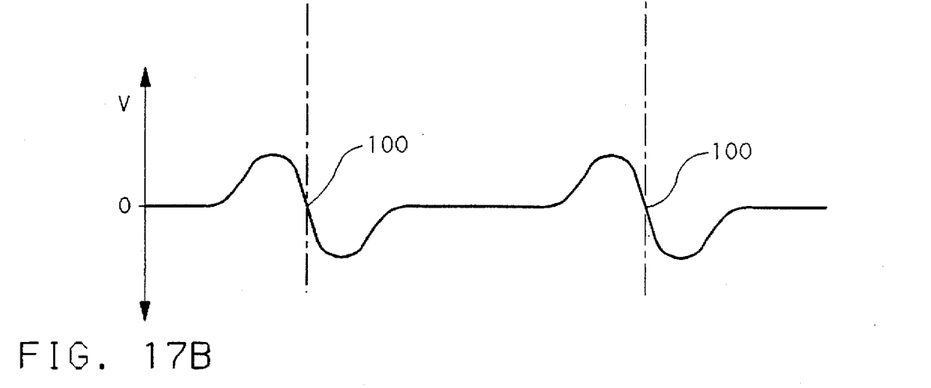

FIG. 17B illustrates a differential signal of the two analog signals of FIG. 17A (87–89). Notice that points 100 along the differential signal of FIG. 17B with a potential of zero volts correspond to the crossover points 92 of FIG. 17A. Signals 87 and 89 of FIG. 17A are fed into comparators 94 and 96, respectively, of the interface circuit of FIG. 18 via signal lines 93 and 95, respectively, to detect only the desired crossovers 92.

Figure 19A:
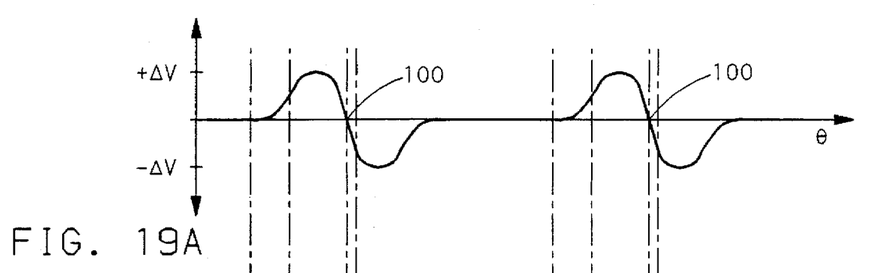
FIGS. 19A through 19D illustrate the binary output of the interface circuit of FIG. 18, and the relationship of the binary output to the crossover points of the MR analog signals.
Figure 19B:
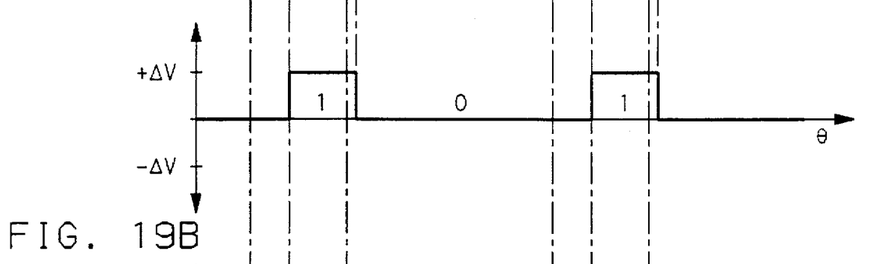
Figure 19C:
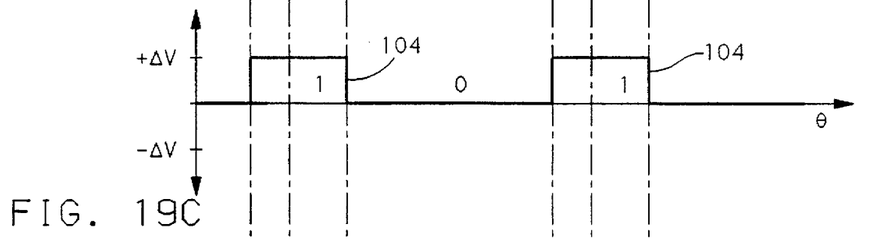

Comparator 94 has a large hysteresis in its switching threshold so that its output (FIG. 19B) will switch from a low voltage (e.g., 0 V and assigned a binary value of "0") to a high voltage (e.g., 5 V and assigned a binary value of "1") when its positive (+) input is greater than its negative (−) input by the hysteresis value ΔV. Similarly, its output will switch from a high voltage to a low voltage when its negative (−) input is greater than its positive (+) input by the hysteresis value ΔV. As illustrated in FIG. 19C, comparator 96, having a negligible hysteresis, outputs a high voltage for all voltages of FIG. 19A greater than zero. The function of comparator 94 is to provide a windowing input for gate comparator 98 which only permits a high voltage output from comparator 98 when a crossover point 100 (FIG. 19A) occurs, as represented in FIG. 19C as the trailing edge 104 of the high voltage output pulse of comparator 96.

Figure 19D:
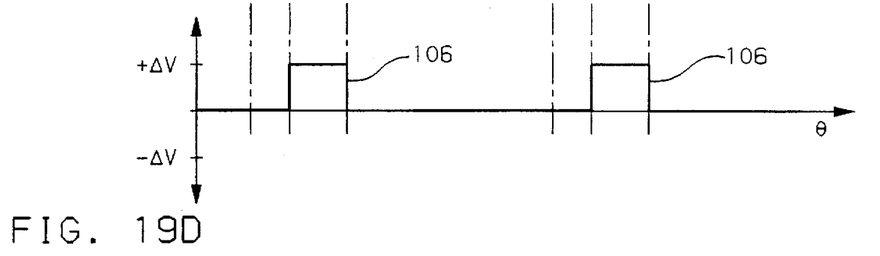

The binary output signal $V_{out}$ of comparator 98 is illustrated in FIG. 19D. It is identical to the binary signal of FIG. 9A achieved by the interface circuit of FIG. 4 for the preferred embodiment.

Notice, however, that in this embodiment, only the trailing edge 106 of each binary pulse corresponds to a crossover point 100, as compared to the preferred embodiment in which both the leading and trailing edges of the binary pulses corresponded to crossover points. In this alternative embodiment, only the trailing edges 106 are utilized by a controller in performing speed and position measurements.

Figure 20:
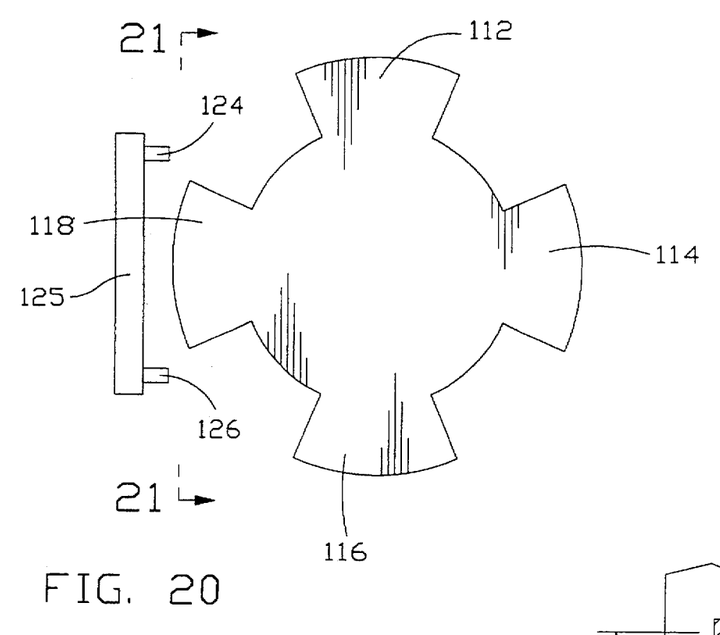
FIG. 20 illustrates a third alternative having two sensors aligned with the target wheel rotation and separated by a distance greater than the length of the teeth positioned along the target wheel periphery.
Figure 21:
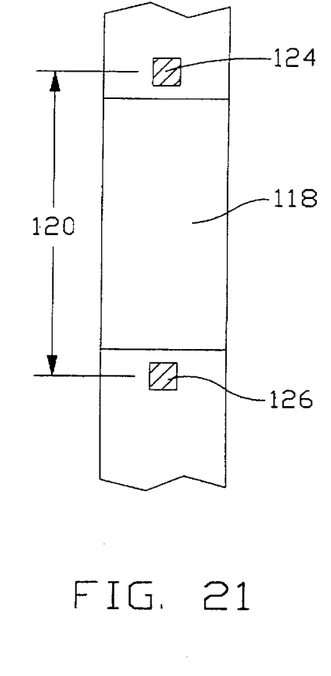
FIG. 21 illustrates a sectional view of the third alternative embodiment of FIG. 20.
Figure 22:
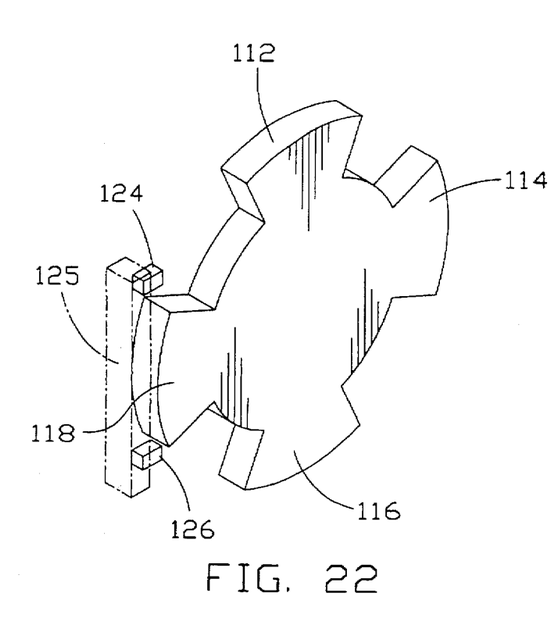
FIG. 22 illustrates a perspective view of the third alternative embodiment of FIG. 20.

A third alternative embodiment, which is a slight deviation from the second alternative embodiment, is illustrated in FIGS. 20, 21 and 22. In this embodiment, the teeth 112, 114, 116 and 118 are of equal length. Two MRs 124 and 126 are mounted on a common biasing magnet 125 and offset 120 by a distance greater than the length of a tooth by an amount required to provide for phase shifted analog signals having crossover points at the maximum slope of the two analog signals.

Figure 23:
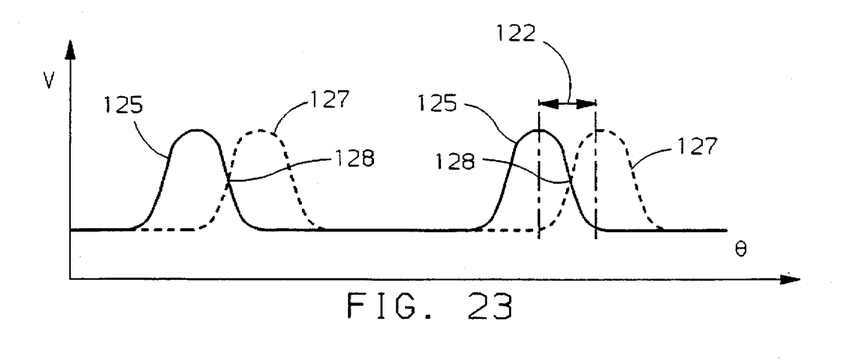
FIG. 23 illustrates the MR analog signals produced by the third alternative embodiment of FIG. 20.

The MR analog signals produced by this embodiment are illustrated in FIG. 23. MR 124 produces signal 125 and MR 126 produces signal 127. The signals are identical to each another but phase shifted 122 as a result of delayed sensing of the same teeth. The differential signal (125–127) of this embodiment is identical to the differential signal of FIG. 17B.

Figure 18:
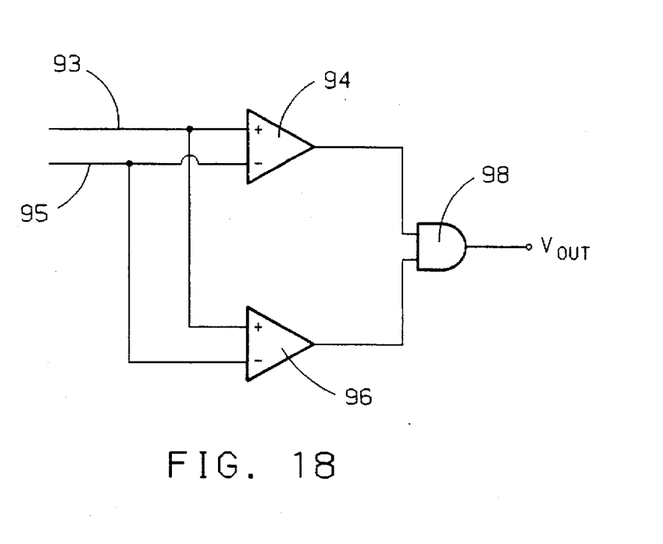
FIG. 18 illustrates an interface circuit for generating and processing the MR analog signals of FIG. 14.

Accordingly, the interface circuit required for this embodiment to detect only the desired crossover points 128 which occur at the maximum slopes of both analog signals is identical to the circuit illustrated in FIG. 18, signals 125 and 127 being fed into comparators 94 and 96, respectively, via signal lines 93 and 95, respectively. The binary output signal for this embodiment is also be identical to that illustrated in FIG. 19D.

The apparatus according to this invention detects the angular position of a rotating object by detecting target wheel elements. The elements, as demonstrated by the illustrated embodiments, can be teeth, slots, toothless regions separating adjacent teeth, or tooth/slot and slot/tooth transitions.

While the present invention has been described in reference to the illustrated embodiments, it will be recognized that various modifications will occur to those skilled in the art. In this regard, it will be understood that apparatuses incorporating such modifications may fall within the scope of this invention, which is defined by the appended claims.

The embodiments of this invention in which an exclusive property or privilege is claimed are defined as follows:

1. An encoder for sensing angular positions of a rotating target wheel, comprising:

teeth, separated by slots, angularly spaced around the periphery of the target wheel; and a sensor including (a) a biasing magnet, (b) a first magnetic field sensing element positioned adjacent the periphery of the target wheel, responsive to the passage of the teeth and slots, and providing a first output that transitions between first and second levels at the passage of each leading and trailing edge of each tooth as it passes adjacent to the first magnetic field sensing element and (c) a second magnetic field sensing element positioned adjacent the periphery of the target wheel, responsive to the passage of the teeth and slots, and providing a second output that transitions between third and fourth levels at the passage of each leading and trailing edge of each tooth as it passes adjacent to the second magnetic field sensing element, the positions of first and second magnetic field sensing elements having a predetermined spacing different from the spacing between the leading and trailing edges of the teeth so that leading edges of the teeth are positioned adjacent one of the first and second magnetic field sensing elements at a predetermined angle of rotation of the target wheel after trailing edges of the teeth are positioned adjacent the other one of the first and second magnetic field sensing elements, the predetermined angle having a value so that the first and second outputs have simultaneous equal values during transitions of the first and second outputs, the simultaneous outputs occurring at precise angular positions of the target wheel.

2. The encoder of claim 1 wherein the simultaneous equal values is the midpoint of each of the first and second outputs.

3. The encoder of claim 1 wherein the simultaneous equal values is at a peak slope of each of the first and second outputs.

4. An encoder for sensing angular positions of a rotating target wheel, comprising:

a first set of alternating teeth and slots angularly spaced around the periphery of the target wheel;

a second set of alternating teeth and slots angularly spaced around the periphery of the target wheel, each slot of each set being (i) axially opposed to a respective tooth of the other set and (ii) having an angular width greater than the angular width of the respective axially opposed tooth of the other set so that each slot of each set overlaps two angularly adjacent slots of the other set; and a sensor including (a) a biasing magnet, (b) a first magnetic field sensing element positioned adjacent the periphery of the target wheel, responsive to the passage of the teeth and slots of the first set, and providing a first output that transitions between first and second levels at the passage of each leading and trailing edge of each tooth of the first set as it passes adjacent to the first magnetic field sensing element and (c) a second magnetic field sensing element positioned adjacent the periphery of the target wheel angularly aligned with the first magnetic field sensing element, responsive to the passage of the teeth and slots of the second set, and providing a second output that transitions between third and fourth levels at the passage of each leading and trailing edge of each tooth of the second set as it passes adjacent to the second magnetic field sensing element, the first and second outputs having simultaneous equal values during each transition of the first and second outputs.

5. The encoder of claim 4 wherein the amount of the overlap of the slots has a value so that the simultaneous equal values during each transition of the first and second outputs is at a midpoint of each of the first and second outputs, the simultaneous equal values occurring at precise angular positions of the target wheel.

6. The encoder of claim 4 wherein the amount of the overlap of the slots has a value so that the simultaneous equal values during each transition of the first and second outputs is at a peak slope of each of the first and second outputs, the simultaneous equal values occurring at precise angular positions of the target wheel.

* * * * *